United States Patent [19]

Cederberg et al.

[11] Patent Number: 4,777,069
[45] Date of Patent: Oct. 11, 1988

[54] FLUID-PERMEABLE FIBRE MATRIX AND A METHOD OF PRODUCING SAID MATRIX

[75] Inventors: Nils E. A. Cederberg, Billesholm; Margareta Häggström, Lund, both of Sweden

[73] Assignee: Gedevelop Aktiebolag, Billesholm, Sweden

[21] Appl. No.: 74,267

[22] Filed: Jul. 16, 1987

Related U.S. Application Data

[63] Continuation of Ser. No. 814,213, Dec. 27, 1985, abandoned.

[30] Foreign Application Priority Data

Jan. 17, 1985 [SE] Sweden ............................. 8500208

[51] Int. Cl.$^4$ ................................................ B32B 5/12
[52] U.S. Cl. ...................................... 428/113; 428/105; 428/224; 428/283; 428/408; 523/222
[58] Field of Search ............... 523/222; 428/224, 109, 428/113, 114, 283, 80, 408, 105

[56] References Cited

U.S. PATENT DOCUMENTS 3,455,818 7/1969 Leifield .................................. 210/31
4,428,763 1/1984 Layden ................................. 501/95
4,464,192 8/1984 Layden et al. ....................... 501/95

FOREIGN PATENT DOCUMENTS 47617 3/1982 European Pat. Off.
WO85/01773 4/1985 PCT Int'l Appl.

*Primary Examiner*—James J. Bell
*Attorney, Agent, or Firm*—Merchant, Gould, Smith, Edell, Welter & Schmidt

[57] ABSTRACT

A fluid-permeable fibre matrix having a large surface area and a method of making said matrix are described. The fibre matrix is characterized in that its fibres are oriented to a high degree in such a manner that the total matrix fibre length is substantially oriented in a main orientation plane, and that membranes are provided between the fibres. It is recommended that at least 60%, preferably at least 80% of the total fibre length of the matrix deviate by at most about 20° from the main orientation plane. The matrix fibres suitably consist of mineral wool, preferably glass wool, while the membranes consist of a film-forming organic or inorganic material, such as synthetic or natural polymeric materials, glass, metals, ceramics, waxes, fats or oils. The membranes may be impermeable or porous, and active material, such as inorganic catalysts, biocatalysts or adsorbing materials, such as activated carbon and zeolites, may be affixed to or incorporated in the membranes. The fluid-permeable fibre matrix may be produced by arranging the main orientation plane of the original fibre matrix which has no membranes, substantially vertical, whereupon a film-forming liquid, such as gelatin, is supplied to the upper end of the fibre matrix. With suitable values of the viscosity and the surface tension of the film-forming liquid, membranes are formed between the matrix fibres, and these membranes are solidified, for example by polymerization, evaporation of solvent, or in some other manner.

10 Claims, 2 Drawing Sheets

FLUID-PERMEABLE FIBRE MATRIX AND A METHOD OF PRODUCING SAID MATRIX

This is a continuation, of application Ser. No. 814,213, filed Dec. 27, 1985 now abandoned.

The present invention relates to a fluid-permeable fibre matrix having a large surface area, and a method of making such matrix.

In a number of processes, such as chemical and biological processes, adsorption processes etc. in which two or more substances interact with one another, it is a well-known fact that the available interface between the interacting substances is a factor determining the rate of the process. The larger the available interface, the quicker and more efficient the process will proceed. In order to increase the available interface, it therefore is common practice to dispose one of the substances on a carrier having a large surface area, the substance frequently being arranged in as thin a layer as possible on the carrier. Consequently, the area of the available interface will increase with an increasing surface area of the carrier, and this surface area in turn increases as the particle size of the carrier is reduced. To carry the desired process into effect, there are provided, in actual practice, a multiplicity of carrier particles, with the substance disposed thereon, in a bed to which is supplied the remaining substance or substances participating in the process. One disadvantage of reducing the particle size of the carrier, thereby to increase the interface available to the process, is in this connection that the energy required to bring the substances participating in the process into contact with each other, for example in the form of an applied pressure, will increase as the particle size of the carrier is reduced. In view hereof, a compromise must usually be made between the carrier particle size and the pressure drop caused by the carrier.

Also for particles of microporosity, it is the outer available surface that is of interest, as will appear from the following first example of prior art technique.

The present invention aims at eliminating these difficulties and providing a fluid-permeable matrix having a large surface area and useful as a carrier, said fibre matrix having, in spite of its large surface area, a low pressure drop when fluid passes through the matrix.

Before the present invention and its advantages will be discussed in more detail, the prior art technique and the difficulties encountered therein will be illustrated by means of two examples.

The first example relates to the adsorption of a substance from a mixture, such as a gaseous or liquid mixture for the purpose of purification or recovery, such as the adsorption of a solvent from a spray-painting plant, the mixture to be treated being conducted through a bed of an adsorbing material, such as activated carbon, zeolite or a microporous polymer, such as polystyrene cross-linked with divinyl benzene. In order to maintain the adsorption capacity of the bed, the bed normally is regenerated periodically, and the periodicity is determined by the maximum content (the breakthrough content) of the substance in question, which emanates from the filter bed and which may be tolerated on grounds of purification or loss.

Figure 1:
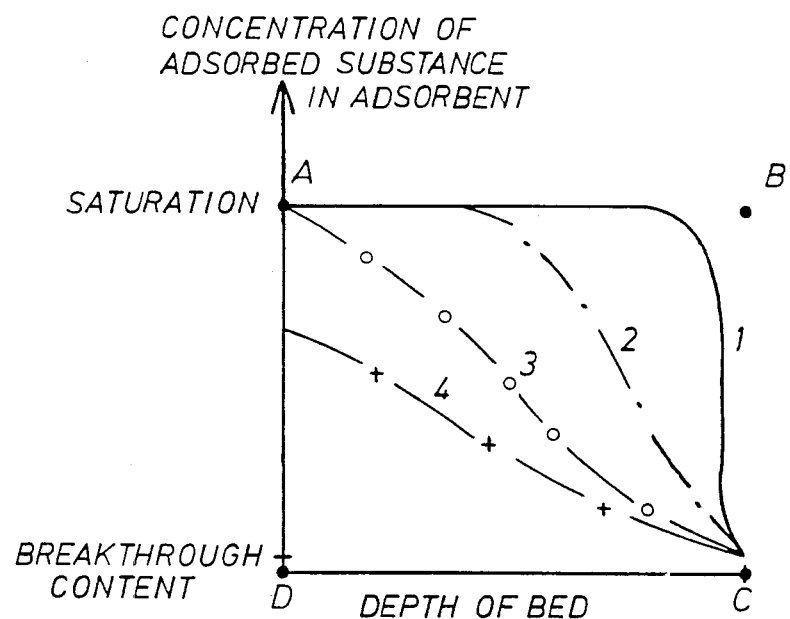
FIG. 1 is a graph indicating relationship between depth of adsorbent bed, and concentration of adsorbed substance in adsorbent.

If the adsorbent is a bed of equally large spherical particles, the solvent content in the particles of the bed, at a given air flow through the bed and a given solvent concentration in the air supplied thereto, will vary at breakthrough with the depth of the bed as illustrated diagrammatically in FIG. 1 wherein curve 1 relates to very small particles and curves 2, 3 and 4 relate to particles having a gradually increasing diameter. The relationship between the surface below the respective curve and the surface of the rectangle having the corners A, B, C, D will thus be a measure of the average degree of utilisation of the adsorbing material.

To economise on adsorption material and make the filter casing smaller and thus less expensive, a small particle diameter and, consequently, a higher degree of utilisation are desired. However, small particles will give a greater pressure drop through the bed and thus higher energy cost. Furthermore, if the filtrated gas or liquid contains particulate impurities, the tendency to clogging of the bed will increase with the reduction in particle size.

An economically optimal filter will thus be a compromise as regards particle size.

The reason for the incomplete degree of utilisation is that the adsorbing substance does not have time to diffuse from the outer surface through the pores into the centre of all particles before the maximally permissible output content has been attained, i.e. breakthrough has occurred.

The conditions illustrated in FIG. 1 will prevail also when the particles are not spherical but of the same geometrical shape, or if they are a mixture of substantially uniform particles having a given average particle diameter but being of different sizes. The determining factor is the longest diffusion length required in the micropores, i.e. the geometrical distance from the outer surface of the particle to its centre. The smaller this distance is, the more completely will the adsorbent be utilised, i.e. the closer will the concentration curve concerned conform to the line A, B, C.

The above analysis is completely correct only if the material transport via diffusion through the micropores is the rate-determining step, and the diffusion rate of adsorbed substance from the bulk of the gaseous or liquid phase to the particle surface and also the adsorption rate on the active surface thus are immaterial. However, these conditions prevail in almost every practical application.

Thus, at a given volume flow and a given content of the substance or substances to be adsorbed, the selection of the particle dimension of the adsorbent will be a compromise between on the one hand the pressure drop and thus the energy cost involved in surmounting this pressure drop and, on the other hand, the degree of utilisation of the adsorbent bed and thus the cost of the adsorbent and the filter casing. A large particle dimension and thus a longer diffusion length will reduce the former cost but increase the latter. Besides, a bed of small particles will have higher clogging tendency in the presence of solid impurities in the gaseous or liquid flow, which is very common in actual practice.

This means that it would be of great practical value if an adsorbent bed could be provided which has a small maximum diffusion length but a retained low pressure drop and comparatively low clogging tendency.

The other example to illustrate prior art technique is the cultivation of microorganisms, such as cells etc., on the surface of a carrier material. In such processes it is desired that the layer of cells on the surface of the carrier material be as thin as possible, and preferably is but a monolayer. In this manner, the diffusion of the nutrients and, where applicable, of the oxygen to the microorganisms as well as the diffusion of metabolites away from the microorganisms will be facilitated. One example of this technique is the biological beds that are used in the purification of wastewater. In these prior art methods, it is difficult to achieve an optimally efficient addition of oxygen to the microorganism. In fact, in order that the microorganism should be able to utilise the oxygen, this must diffuse through the liquid phase of substrate solution surrounding the microorganism. Such diffusion through the liquid phase normally is very slow and is the step which determines the rate of the entire process. Therefore, several attempts have been made to facilitate and accelerate the oxygen transfer, for instance by agitation, fine division of the air, fine division of the substrate solution into droplets, etc. Although these measures give a certain improvement, they require relatively large amounts of energy.

For instance, the cost of oxygenation often is, next to costs for raw material and equipment, the largest cost in industrial biological processes. Moreover, the fine division effected to increase the liquid-gas contact surface generally is not very efficient. Thus, even if the substrate solution is divided into fine droplets, each droplet has a substantial mass or bulk into which the air can diffuse entirely only after a relatively long period of time.

It appears from the above that the oxygen transfer capacity of the system which is decisive of the rate of aerobic biological processes, is not optimal in prior art systems, which is a serious drawback, inter alia because it sets an upper limit to the final cell concentration or productivity in the substrate. In biological processes, it is desired almost without exception that this concentration or productivity be as high as possible.

It is against this background, and in order to eliminate the described drawbacks of prior art technique, that the present invention has been developed. As mentioned before, the invention relates to a fluid-permeable fibre matrix having a large surface area, an area that is achieved in the present invention by providing the matrix between the fibres with spaced-apart thin disks or membranes, the planes of which are substantially parallel to the direction of the fluid flow which is intended to pass through the fibre matrix.

The characteristic features of the invention will appear from the appended claims.

The invention primarily uses a fibre matrix of mineral wool, preferably glass wool. Such fibre matrices have all the properties which are required of a matrix according to the present invention, such as inertness, low resistance to gas and liquid flow, good dimensional stability, etc., and can also be manufactured at low cost.

A matrix of glass wool with a density of 23 kg/m$^3$ which is a normal value for a glass wool construction insulating panel consists of about 1% by volume of glass and 99% by volume of voids.

The matrix fibres have an average diameter of about 1-500 μm, preferably about 1-100 μm, and most preferably about 1-20 μm.

According to the invention, the fibres in the mineral wool matrix have a main orientation plane, at least 60% of the total fibre length of the matrix deviating by at most 20° from said main orientation plane. Preferably, the deviation is at most 20° in at least 70%, and most preferably at least 80% of the total fibre length of the matrix.

The main orientation plane of the fibres in the mineral wool matrix according to the invention is accomplished for example by increasing, during the preparation of the matrix, the rate of motion compared to the normal rate of motion of the substrate on which the fibres are laid, the plane of the substrate corresponding to the main orientation plane of the matrix fibres. However, the invention is not restricted to any special method of providing the dominant fibre orientation, and every matrix which has the main orientation plane here concerned and in which at least 60% of the total fibre length deviate by at most 20° from the main orientation plane, is included, regardless of the production technique.

As mentioned above, the matrix according to the present invention is three-dimensional, which means that it has an extent in each of three planes perpendicular to each other of at least 10 times the fibre diameter. In order to increase the self-supporting capacity of the three-dimensional fibre matrix, the fibres of the matrix may be linked together at their points of intersection by chemical or mechanical bonds. One example of chemical bonding is interconnecting the fibres at their points of intersection by means of polymer binders, for instance of the phenolic resin type. Another example of bonding is fusing the fibres at their points of intersection by heat or by means of a solvent. One example of mechanical bonding is needling the fibre material. A three-dimensional matrix thus bonded is substantially self-supporting, which means that a particular equipment for encapsulating the matrix is normally not required. It may, however, be desirable or suitable in some cases to provide the matrix element with external support means which may be designed in a simple and inexpensive manner as gas-permeable walls of, for example, wire netting or perforated metal sheets.

In its simplest embodiment, the matrix consists of a homogeneous fibre body, i.e. of fibres having substantially the same size and properties. To counteract penetration of liquid from the downwardly flowing liquid at the vertical boundary walls of the matrix, the outer vertical surfaces of the matrix may be made hydrophobic by treating the fibres in these outer surfaces with hydrophobating oils, waxes or polymers in per se known manner. In these outer layers, the fibres are thus not wetted by the liquid, and the resistance to liquid penetration therefore is high, while the gas pressure drop is maintained low. This means that the outer layers constitute an outer boundary to the inner wetted layers of the matrix and allow the gas, but not the liquid, to pass therethrough.

Further alternative embodiments of the matrix according to the invention include multilayer matrices in which the matrix body is composed of a plurality of different fibre layers which are distinct or continuously merging into each other and which differ by their fibre diameter, distribution of fibre diameter, fibre length, density, etc. These fibre layers are suitably arranged in parallel beside each other or concentrically around each other in the direction of flow of the liquid. In the case of distinct fibre layers, the layers may either engage each other directly or be separated by intermediate layers which preferably are hydrophobic.

Although the structure and the material of the surface-enlarged membranes in the fibre matrix of the invention may vary, the membranes are all formed in situ in the fibre matrix by means of a film-forming material. The finished membrane may be polymeric, metallic, crystalline, amorphous or vitreous and extend between different fibres which, in addition, may be completely or partly covered by the membrane-forming substance. The membrane material consists of organic or inorganic materials which, under normal ambient conditions, are film-forming or may be made film-forming by, for example, heating to the softening or melting temperature of the membrane material. As examples of membrane material, mention may be made of glass, metals, ceramics, waxes, fats, oils and film-forming synthetic and natural polymeric materials. Membranes of organic materials may also be carbonated.

The membranes in the fibre matrix may be either substantially impermeable, i.e. essentially impermeable to gases and liquids, or porous, such as microporous.

The fibre matrix as defined by the present invention and provided with membranes may either be utilised as such, for example as an adsorbent, or it may be utilised as a carrier for fixing on the membrane an "active" material intended to interact with one or more other substances in a process. As examples of active materials that can be fixed to the fibre matrix according to the invention, mention may be made of functional groups which, by chemical aftertreatment, can be introduced into the membrane, or catalysts by which are meant both conventional inorganic and organic catalysts for influencing of chemical reactions, and so-called biological catalysts or biocatalysts by which are meant bacteria, yeast, fungi, algae, animal cells, human cells, plant cells, proteins and enzymes. Also adsorbing materials, such as activated carbon, zeolites and other porous materials having a large inner surface can be fixed to the fibre matrix according to the invention and are comprised by the above-mentioned active materials.

Fixing the active material to the membrane in the fibre matrix according to the invention can be carried out in different ways. For example, the active material may be fixed on top of the membrane surface by means of physical adhesion forces, chemical bonds, or by means of binders, or the active material can be more or less enclosed by the membrane and fixedly anchored therein. Such enclosure of the active material in the membrane may be accomplished either by forming the membrane as a porous layer, in which case the active material is enclosed within the pores, or by supplying the active material during formation of the membranes, before these have solidified so that the active material to a greater or less extent is moulded into the membranes.

As mentioned before, the invention also comprises a method of preparing a fluid-permeable fibre matrix of the type referred to above, and to illustrate this aspect of the invention, a typical production of a fibre matrix according to the invention will be described below.

A porous three-dimensional mineral wool matrix of the type described above, having a high degree of fibre orientation such that the total fibre length is arranged substantially in one main orientation plane, as has also been mentioned before, is placed with the main orientation plane substantially vertical. To the upper end face of the fibre matrix arranged in this manner, a membrane-forming liquid is added which is allowed to flow downwardly through the matrix. The membrane-forming liquid wets the fibres of the matrix and has a suitable viscosity and surface tension to form membranes preferably between the fibres in the main orientation plane. The membrane-forming liquid is caused to solidify by polymerisation, evaporation of any solvent from the liquid, cooling or in some other manner. The solid membrane formed by this solidification process may be used either as it is or may be further treated to be made, for example, microporous and to form a microporous adsorbent. Since the fibre matrix is porous and readily permeable to both gas and liquid, it may be used as an adsorbent bed. Compared to a particle bed, this bed exhibits, besides the advantages of a low pressure drop and insignificant clogging tendency, also a self-supporting capacity whereby equipment expenditure can be reduced considerably. Furthermore, because of the reinforcing effect of the fibres, use may be made also of adsorbents having a very low mechanical strength.

The thickness of the membranes may be controlled by suitable selection of the fibre diameter, the viscosity of the liquid, its surface tension and fibre wetting characteristics, the reaction rate, liquid flow, possibly renewed liquid throughflow of the solidification process etc. The adsorbent quantity per volume unit is determined by the average membrane thickness, the degree of fibre orientation and the original density of the fibre matrix.

By using a membrane which swells in the presence of solvents, high absorption capacity can be combined with high accessibility to large molecules, which is of special interest in the separation and purification of biological materials. There is no restriction to the thickness of the membranes according to the invention, whether they are swelled or not. The increasing flow resistance resulting from an increasing membrane thickness, on the other hand, sets a limit to the thickness in actual practice. This limit varies considerably between and within different applications and depends entirely upon the pressure drops and flows that can be accepted in the individual case.

To reduce the tendency to form membranes which are substantially transverse to the contemplated direction of flow during subsequent use of the fluid-permeable fibre matrix, air or some other suitable gas may be blown in the direction of flow during this solidification process. If it is desired to influence the rate of the solidification process by means of a gaseous catalyst or heat, use may preferably be made of air or some other gas as carrier. If the solidification process involves evaporation of solvent, the air or gas may furthermore be used for removing evaporated substance.

As mentioned before, the three-dimensional fibre matrix of the invention has a high degree of orientation in that the total fibre length of the matrix is arranged substantially in one main orientation plane. Thus, the inventors have surprisingly found that an unexpected increase in the available surface of the fibre matrix, per unit of weight of membrane-forming substances, is obtained, i.e. an improved membrane formation, with increasing fibre orientation of the matrix. This increase is especially noticeable when at least 60% of the total fibre length deviate by at most 20° from the main orientation plane. Furthermore, the flow resistance of the fibre matrix and the risk of clogging of the matrix by particles contained in the fluid supplied, such as impurities in a nutrient solution in the cultivation of microorganisms, are less in the case of an increased degree of fibre orientation.

The invention will be illustrated by the following Example.

EXAMPLE

Glass wool matrices with different degrees of orientation are provided with gelatin membranes, and the relative outer surface is determined. Gelatin powder is dissolved in hot water to a concentration of 50 g/liter, Fibre matrices of mineral wool having a density of 40 g/dm$^3$ and a fibre diameter of 4 μm, and with different degrees of fibre orientation, are wetted with water, whereupon 1 liter of gelatin solution per liter of matrix is added. The solution is allowed to flow along the main orientation plane of the fibres. The matrix is then placed at 80° C. for 6 hours to make the gelatin form membranes in the form of polymeric films between the fibres of the matrix.

Figure 2:
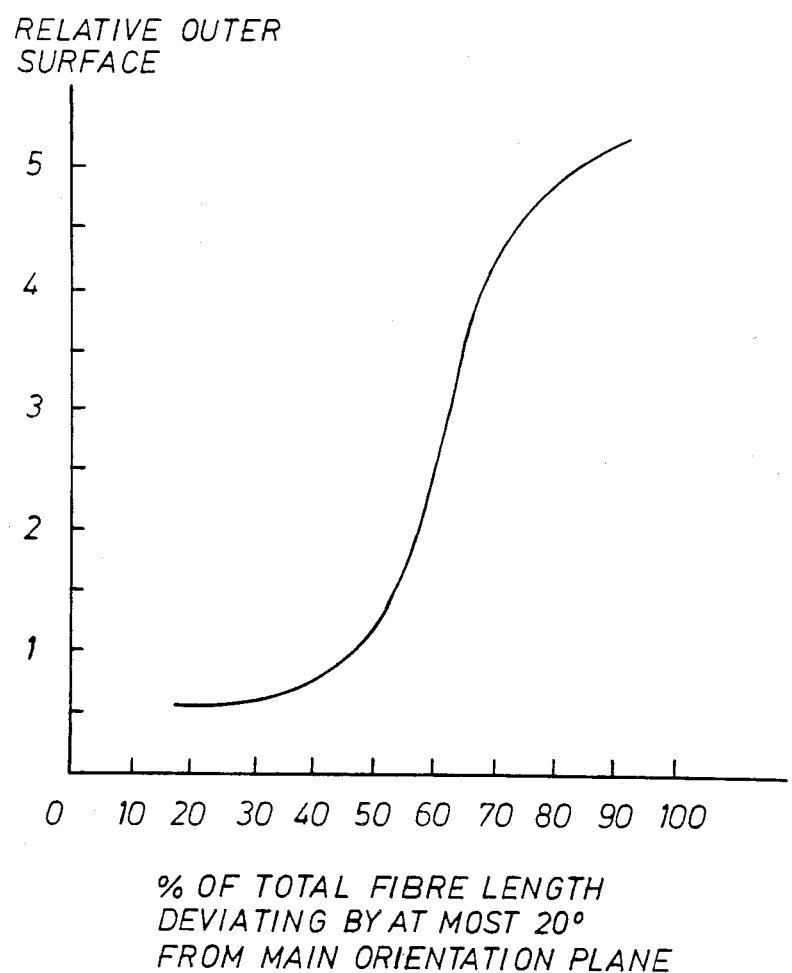
FIG. 2 is a graph indicating the relationship between % of total fiber length deviating by at most 20° from main orientation plane, and relative outer surface, for the experiment reported in the Example.

The outer surface of the matrix is determined by measuring the adsorbed quantity of the enzyme bovine pancreas ribonuclease (from Sigma Chemical Co.). Prior to use, the enzyme was dialysed and heat treated (62° C.) whereupon the matrix was filled with an enzyme solution containing 2 g of enzyme and 0.05 M KNO$_3$ per liter of water. Enzyme that had not been adsorbed, was then washed off, and the adsorbed enzyme quantity was measured and deposited in the form of a "relative outer surface" (increasing adsorbed enzyme quantity=increasing relative outer surface) as a function of the fibre orientation degree of the matrix, which was indicated by the percentage of the total fibre length that deviated by at most 20° from the main orientation plane. The curve obtained in this respect is shown in FIG. 2, and it appears that a marked increase of the outer surface is obtained when the matrix fibres show a pronounced orientation in the main orientation plane, more particularly when at least 60% of the total fibre length deviates by at most 20% from the main orientation plane of the fibres in the matrix.

What we claim and desire to secure by Letters Patent is:

1. A fluid permeable fibre matrix having a large surface area comprising a plurality of fibres substantially oriented in a main orientation plane and a membrane extending between the fibres and said fibres extending from the membrane, said matrix being three dimensional.

2. A fluid permeable fibre matrix as claimed in claim 1, characterised in that at least 60% of the total fibre length of the matrix deviates by at most about 20° from the main orientation plane.

3. A fibre matrix as claimed in claim 2, characterised in that at least 80% of the total fibre length of the matrix deviates by at most about 20° from the main orientation plane.

4. A fibre matrix as claimed in claim 1, characterised in that the fibres consist of mineral wool.

5. A fibre matrix as claimed in claim 1, characterised in that the membranes consist of a film-forming organic or inorganic material selected among glass, metals, ceramics, waxes, fats, oils, and synthetic and natural polymeric materials.

6. A fibre matrix as claimed in claim 1, characterised in that the membrane is substantially impermeable.

7. A fibre matrix as claimed in claim 1, characterised in that the membrane is porous.

8. A fibre matrix as claimed in claim 1, characterised in that it includes an active material which is affixed to the membrane and said active material comprising functional groups, inorganic and organic catalysts, biocatalysts and adsorbing materials.

9. A fibre matrix as claimed in claim 8, characterised in that the adsorbing material is selected among activated carbon and zeolites.

10. A method of making a fluid permeable fibre matrix having a large surface area comprising the steps of:
orientating the fibres in a main orientation plane, passing a film forming liquid on one end of the fibres, allowing the liquid to solidify to form a membrane between the fibres, thereby creating a matrix of fibres on the membrane with said fibres oriented substantially in said plane.

* * * * *